United States Patent [19]
Martin

[11] Patent Number: 5,395,593
[45] Date of Patent: Mar. 7, 1995

[54] PROCESSING VESSEL

[75] Inventor: Peter D. Martin, Didcot, United Kingdom

[73] Assignee: The Secretary of State for United Kingdom Atomic Energy Authority in Her Britannic Majesty's Government of the United Kingdom of Great Britain and Northern Ireland, Didcot, United Kingdom

[21] Appl. No.: 207,631

[22] Filed: Mar. 9, 1994

[30] Foreign Application Priority Data

Apr. 3, 1993 [GB] United Kingdom ............... 9307225

[51] Int. Cl.6 ..................... B06B 1/20; B01F 7/22; B01F 11/02
[52] U.S. Cl. ................... 422/128; 366/114; 366/264; 422/224; 422/227
[58] Field of Search ............. 422/127, 128, 224, 227; 366/114, 127, 264

[56] References Cited

U.S. PATENT DOCUMENTS

| | | | |
|---|---|---|---|
| 3,021,119 | 2/1962 | Van Der Burgt | 366/114 |
| 3,161,402 | 12/1964 | Willems | 366/118 |
| 4,256,839 | 3/1981 | Solomons et al. | 435/314 |
| 4,258,007 | 3/1981 | Gragg et al. | 422/227 X |
| 4,302,112 | 11/1981 | Steenstrup | 366/114 |
| 4,731,227 | 3/1988 | Pulvari | 422/127 |
| 4,798,131 | 1/1989 | Ohta et al. | 422/227 X |

FOREIGN PATENT DOCUMENTS

| | | |
|---|---|---|
| 0584685 | 3/1994 | European Pat. Off. |
| 0891152 | 3/1962 | United Kingdom |
| 2243092 | 10/1991 | United Kingdom |
| 1245396 | 7/1986 | U.S.S.R. |

Primary Examiner—Robert J. Warden
Assistant Examiner—Robert Carpenter
Attorney, Agent, or Firm—William R. Hinds

[57] ABSTRACT

A processing vessel (10) for a liquid includes an impeller (32) in an open-ended shroud (30) to cause circulation. The base of the vessel (10) communicates with a short duct (18) closed at its lower end, and the shroud (30) is shaped to ensure circulation into this dead-end duct (18). The duct is provided with ultrasonic modules (24) so that its contents are subjected to intense insonation. The insonation of the liquid can lead to improvements in the product of processes such as crystallization.

9 Claims, 3 Drawing Sheets

PROCESSING VESSEL

This invention relates to a vessel for use in processing liquids or liquid/solid mixtures, and in particular to a vessel for subjecting the liquid or liquid/solid mixture to insonation.

If a liquid is subjected to a high ultrasonic intensity, for example above 0.3 $W/cm^2$, then there is a significant deposition of energy into the liquid through attenuation and non-linear effects. This can be associated with cavitation in which small bubbles are created which are filled with vapour or gas, and which collapse rapidly during the compression half-cycle of the ultrasonic wave. Temperature transients of thousands of degrees and pressure transients of hundreds of atmospheres are produced over volumes a few tens to hundreds of micrometers across. Transient shock waves are also produced in the vicinity of the cavitation bubbles. The resulting chemical changes may be referred to as sohochemistry, while there may also be physical changes, such as emulsification. A device for subjecting liquid in a tube of 125 mm bore to such insonation is described in GB 2 243 092 A. However only a small volume of liquid can be insonated in such a device, and the use of such a device in a pumped loop connected to a reaction vessel (as suggested in that document) is not always acceptable.

According to the present invention there is provided a processing vessel comprising walls and a base defining a container for a liquid the container defining no loops, an impeller to cause flow of liquid in the container, means to define a duct whose bore communicates with the liquid in the container and means to subject liquid in the duct to a high ultrasonic intensity, and the impeller being arranged to cause circulation of liquid between the duct and other parts of the vessel.

the duct may be a dead-end duct projecting from the container and forming part of the base of the container. In this case there is desirably a shroud arranged to constrain the liquid flow in the vicinity of the impeller, the shroud being shaped so as to eject a jet of liquid into the duct. Alternatively the duct may be supported and enclosed entirely within the container away from the walls thereof, and aligned with such a shroud. The duct might be just below the surface of the liquid, and the shroud be arranged to send a jet of liquid into the duct. Alternatively the duct might be immersed within the liquid, so liquid can flow through it, and in this case the duct may form at least part of the shroud.

In a preferred arrangement the container is of generally cylindrical shape, and the shroud is of circular cross-section. Where there is a dead-end duct, the base, the walls and the duct may all form parts of a single integral component. Alternatively one or more of them may be separate, and connected for example by flanges. The dead-end duct may be provided with a port and valve at its closed end so liquid and solid particles can be drained from the container.

The vessel thus provides a single self-contained unit whereby a liquid can be processed. All or most of the surfaces with which the liquid comes in contact may be of electropolished stainless steel for example, so the vessel can be suitable for treating liquids which must be kept very clean and sterile. No external pipe loops are required, and no pump is needed to bring about liquid flow. A conventional reaction vessel with a conventional impeller can be modified to form the processing vessel of the invention with only minor modifications to the reaction vessel itself and only a small change in the capacity of the reaction vessel.

The process may involve a chemical reaction. Alternatively or additionally it may involve crystallisation. With several different materials it has been found that insonation with intense ultrasound reduces the extent to which supersaturated solutions can develop, by triggering nucleation, so that crystallisation occurs at lower supersaturation. This is of particular relevance when very pure crystalline products are formed, as the purity of the liquid and cleanliness of the vessel surfaces means that crystallisation nuclei are not otherwise present. The process vessel of the invention can hence enable a purer crystalline product to be obtained, and can enable different sizes of crystals to be formed. The resulting crystalline material, when separated from the liquid, may for example be more free-flowing, and may be of greater bulk density.

BRIEF DESCRIPTION OF THE DRAWINGS

The invention will now be further described, by way of example only, and with reference to the accompanying drawings in which:

Referring to FIG. 1, a processing vessel 10 comprises a tubular cylindrical stainless steel wall 12 with flanges at each end, a domed lid 14 at the top with a valved inlet duct 15, and a curved reducer 16 forming a base. The reducer 16 defines a flanged port of internal diameter 130 mm at the centre of the base to which is connected a flanged duct 18 of the same diameter. The duct 18 is of length 300 mm, and at its lower end is closed by a conical end plate 19 provided with a drain tube 20 and a valve 21. During operation of the processing vessel 10 the valve 21 is kept closed. The duct 18 is provided with three ultrasonic modules 24 equally spaced around it, which are described in detail below in relation to FIG. 2, and the modules 24 are enclosed by a two-piece annular protective cover 26 of U-shaped section.

Figure 1:
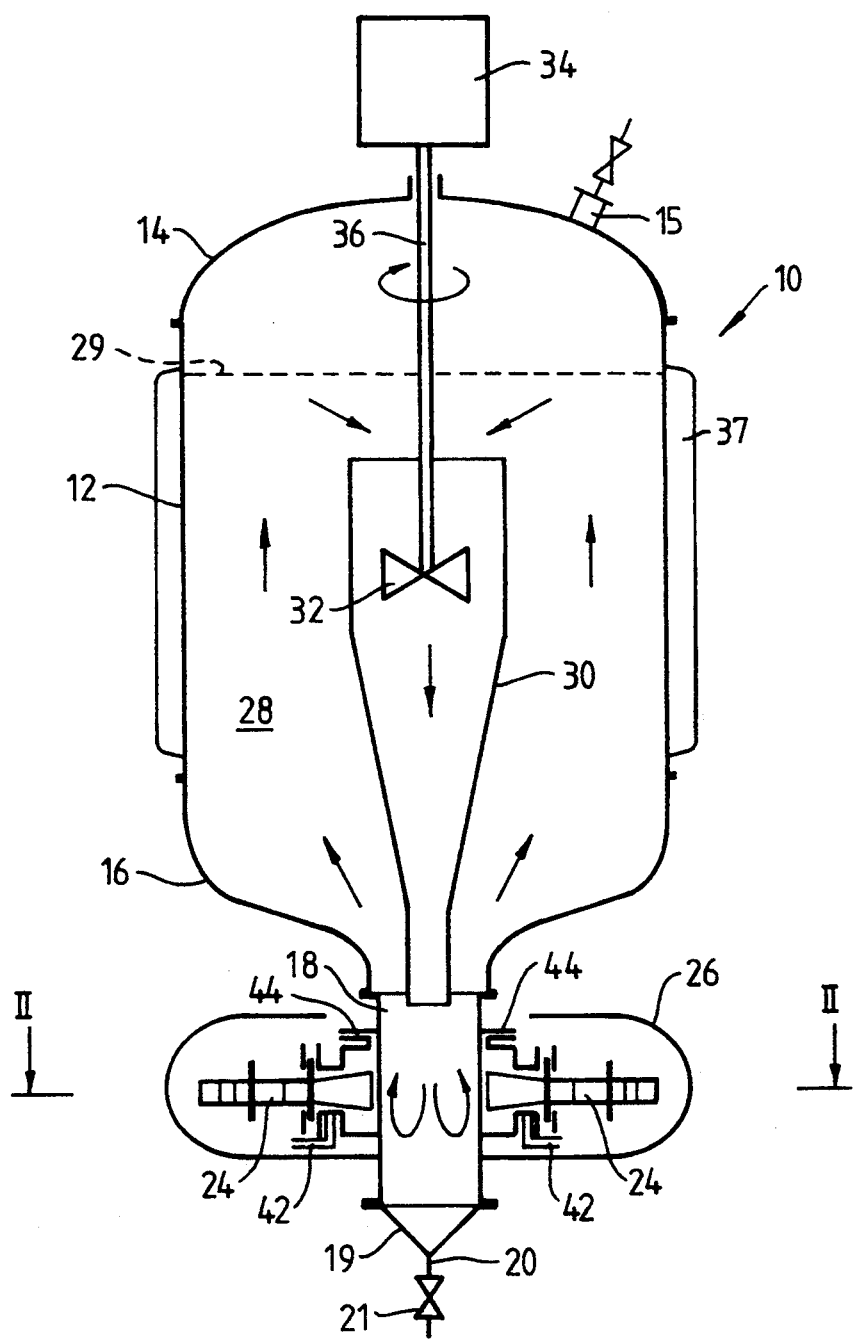
FIG. 1 shows a longitudinal sectional view, in a vertical plane, of a processing vessel.

The wall 12 is of diameter 450 mm and height 700 mm, so that the wall 12, the reducer 16, and the duct 18 together define a liquid container 28 of volume about 150 liters, the typical liquid level 29 being indicated by a broken line. Coaxially supported within the container 28 is a stainless steel tubular shroud 30 open at each end, with a cylindrical upper section of diameter 210 mm, a conically tapering middle section, and a cylindrical lower section of diameter 60 mm; the upper end of the shroud 30 is below the liquid level 29, while its lower end is level with the top of the duct 18. Within the upper section is an impeller 32 driven by a motor 34 by means of a shaft 36 which extends through an axial port in the lid 14. The container 28 is also provided with a heat transfer jacket 37.

Figure 2:
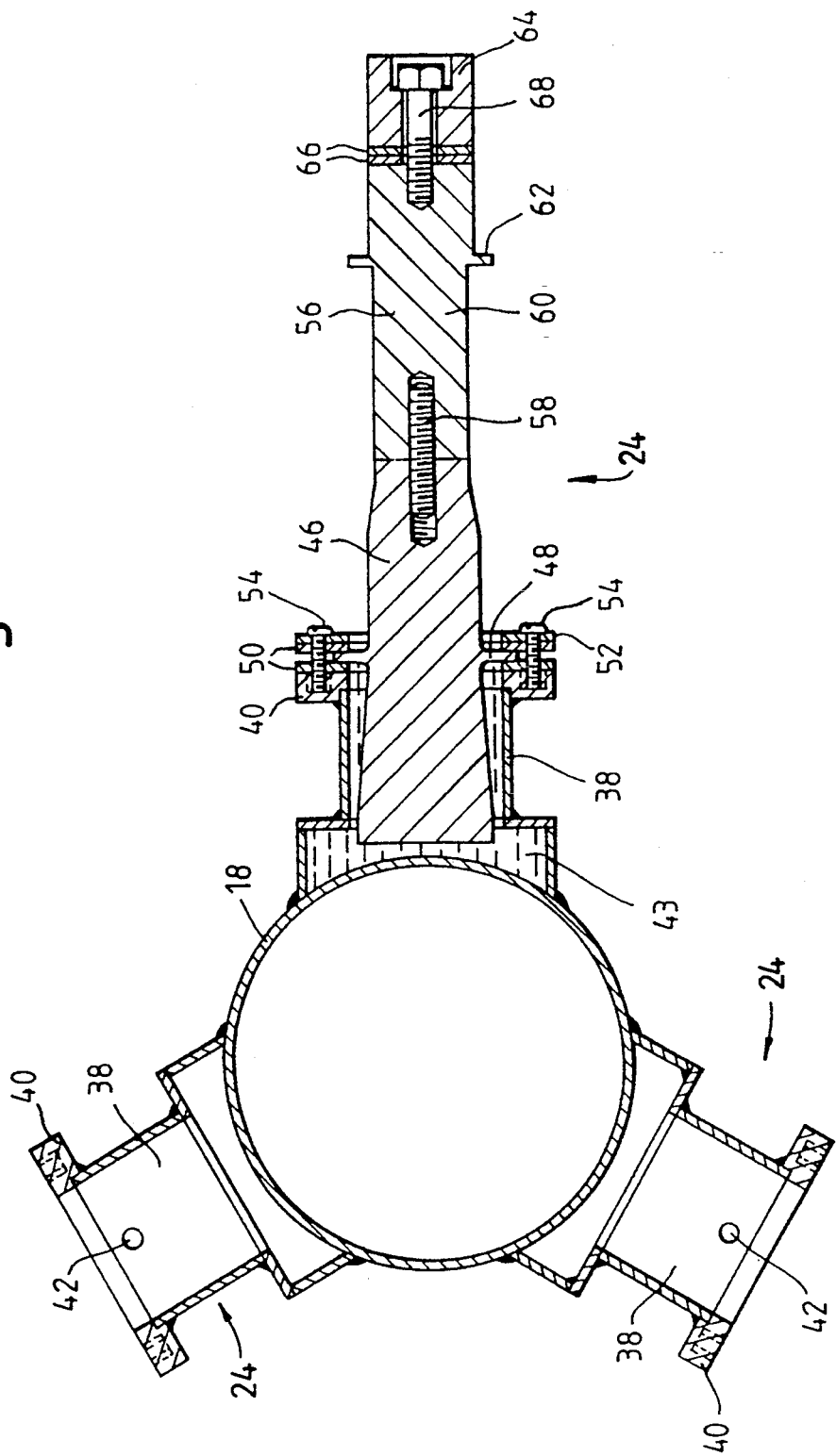
FIG. 2 shows a sectional view on the line II—II of FIG. 1.

Referring now to FIG. 2 there is shown a cross-sectional view of the duct 18 and the three ultrasonic modules 24, only one of which is shown completely. The duct 18 is of wall thickness 2.5 mm and bore diameter 130 mm. Three stepped stainless steel collars 38 of wall thickness 3 mm are welded to the outside of the duct 18 in a common plane, equally spaced around it; at the outer end of each is a mounting flange 40. Referring also to FIG. 1, each collar 38 is provided with inlet ports 42 and outlet ports 44 for circulating olive oil 43 through the collar 38 and a heat exchanger (not shown). Each collar 38 encloses one end of a generally cylindrical titanium alloy half-wavelength coupler 46 (only one being shown in FIG. 2) which has a nodal flange 48. The coupler 46 is held coaxial with the collar 38 with its end face 6 mm from the outside of the wall of the duct 18 by clamping the outer edge of the nodal flange 48 between two silicone rubber gaskets 50 held between the mounting flange 40 and a steel clamping ring 52 and secured by screws 54 (only two are shown).

To the other end of the coupler 46 is firmly fixed a transducer assembly 56 by means of a short threaded stud 58 which engages in correspondingly threaded holes in the coupler 46 and the assembly 56. The abutting faces are smooth and flat to maximize the coupling of ultrasonic waves from the assembly 56 into the coupler 46. The resonant frequency of the assembly 56 is 20 kHz, and the coupler 46 is half a wavelength long at that frequency, so that the flange 48 is at a position which in operation is a node of displacement. The end of the coupler 46 adjacent to the assembly 56 is 33 mm in diameter (the same diameter as the adjacent end of the assembly 56), but the other end is of diameter 50 mm in order to couple ultrasound more efficiently into the olive oil 43. At each end is a short cylindrical portion; between the wider end portion and the flange 48 the coupler 46 tapers uniformly; the coupler 46 has the same diameter at each side of the flange 48 and on each side of the flange 48 is a fillet; and between the flange 48 and the narrower end portion is a cylindrical portion and then a short tapered portion.

The transducer assembly 56 comprises a generally cylindrical titanium alloy coupling block 60 (which also defines a nodal flange 62) and a cylindrical titanium alloy backing block 64, between which are sandwiched two annular discs 66 of pzt (lead zirconate titanate) piezo-electric material polarized in opposite directions. The assembly 56 is held together by an 8 mm diameter bolt 68 which is tight enough to ensure the discs 66 remain in compression in operation. The dimensions and masses are such that the assembly 56 resonates at about 20 kHz. Such an assembly is available from Sonic Systems, Isle Brewers, Taunton, Somerset.

In operation of the processing vessel 10 each transducer assembly 56 is connected to a respective 20 kHz signal generator (not shown), the electrical signals being supplied to the adjacent faces of the discs 66 and the outer faces being earthed. Typically each generator might provide an electrical power of about 300 W to the assembly 56. Olive oil 43 is circulated through the collars 38 and the heat exchanger to prevent overheating. Due to energy losses, principally due to reflection at the interface between the olive oil 43 and the duct 18, the sonic power to which the liquid inside the duct 18 is subjected is about 200 W from each assembly 56. Where the liquid is water, cavitation has been found to occur over the length of the duct 18 (about 300 mm), so the treated volume is about 3.6 liters.

At the same time the impeller 32 is activated so that the liquid is circulated, as indicated by the arrows, into the dead-end duct 18 and around the remainder of the container 28. Hence substantially all the liquid in the container 28 is, over a period of time, subjected to the intense insonation within the duct 18. For example the liquid might be one whose pH is being gradually changed (by addition of an acid or an alkali) so that crystallisation of a product occurs; or supersaturation may occur as a result of addition of a reagent to form a compound with a solute dissolved in the liquid, the compound being of lower solubility; or supersaturation might be brought about by addition of another solvent; or by changing the temperature of the liquid. The use of the processing vessel 10 enables the crystallisation process to be carried out in a more controlled manner, and enables a purer product to be obtained.

It will be appreciated that the processing vessel may differ from that described above while remaining within the scope of the invention. The container 28 might have a different volume, for example the wall 12 might be 1.0 m high and 0.6 m diameter so the volume is about 300 liters, and the duct 18 might be of larger diameter for example 225 mm, so the insonated volume is larger. The wall 12, reducer 16 and duct 18 might be of a different material, for example the wall 12 and reducer 16 of glassed steel, and the duct 18 of a corrosion resistant alloy. The duct 18 might also be provided with a liner of polytetrafluoroethene (PTFE). The wall 12 and the reducer 16 may be integral with each other. The shroud 30 may include baffles projecting from its inner surface to suppress circulatory flow within it.

The number and arrangement of the ultrasonic modules 24 might also differ, for example there might be two sets of three such modules 24 spaced axially apart along the duct 18. The collars 38 are desirably of such a length that the gap between the end of the coupler 46 and the nearest part of the wall is less than 10 mm and much less than a quarter wavelength in the buffer liquid 43, preferably about 6 mm. The gap between the sides of the coupler 46 and the collar 38 is preferably less than 10 mm, but preferably no less than 2 or 3 mm. The collar 38 itself is desirably between 2 and 5 mm thick, preferably about 3 mm thick, and of steel.

The buffer liquid 43 may be olive oil as described; the buffer liquid must give low attenuation and have a cavitation threshold above that of the liquid within the duct 18, so that other buffer liquids may be used. Means may be provided to circulate the buffer liquid and to cool it, as described above; this may utilize a pump, or passive circulation may be sufficient, and indeed there may be no need to provide a heat exchanger.

Figure 3:
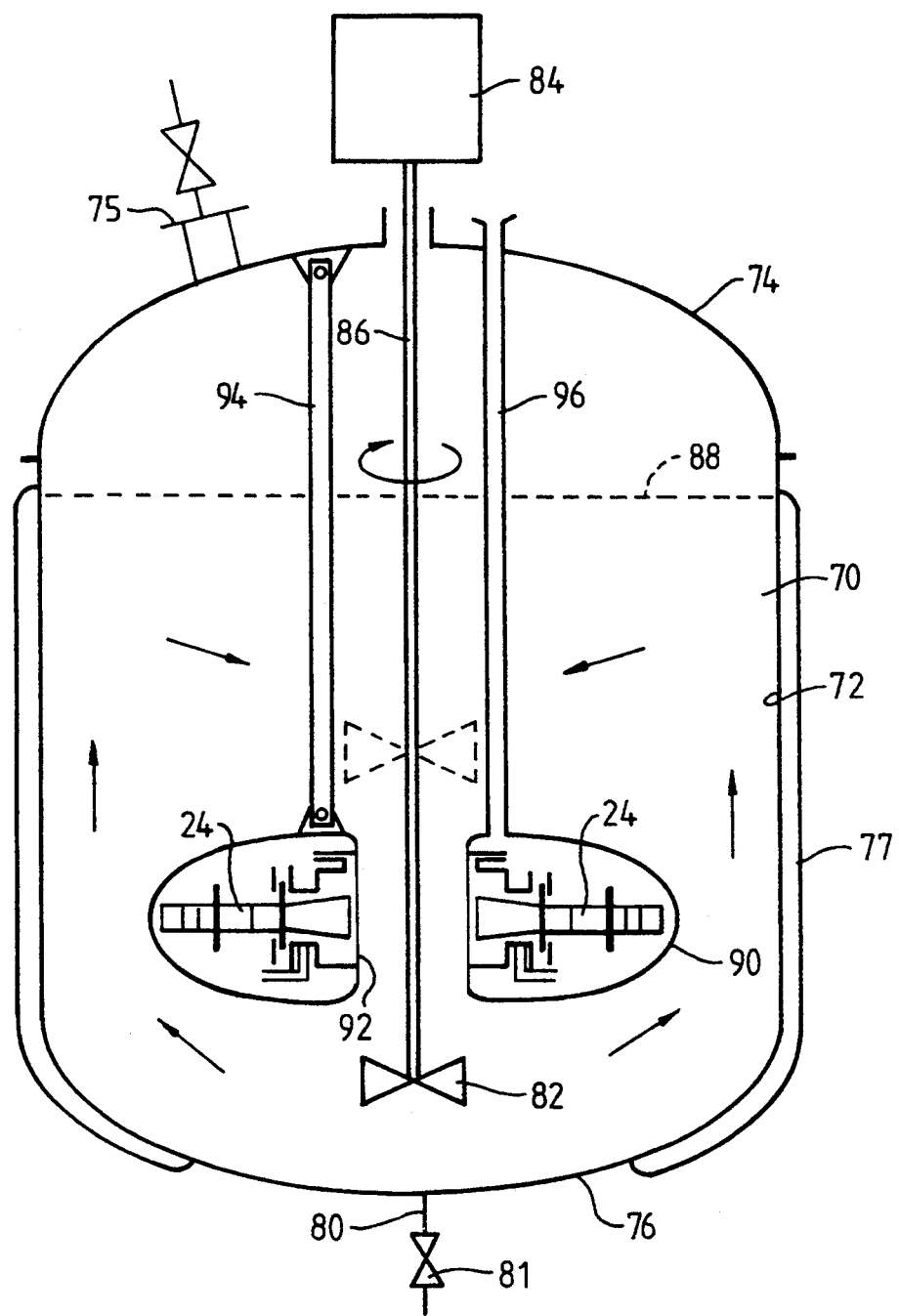
FIG. 3 shows a longitudinal sectional view, in a vertical plane, of an alternative processing vessel.

Referring now to FIG. 3 there is shown an alternative processing Vessel 70, similar in many respects to that of FIG. 1. The vessel 70 comprises a tubular cylindrical stainless steel wall 72 integral with a curved base 76, and with a flanged connection to a domed lid 74 with a valved inlet duct 75. The vessel 70 is provided with a heat transfer jacket 77, and at its lowest point is provided with a drain tube 80 and a valve 81 (which is closed during operation). An impeller 82 is located near the base 76, driven by a motor 84 by means of a shaft 86 which extends through an axial port in the lid 74. The impeller 82 is thus well below the normal liquid level 88 which is indicated by a broken line.

Above the impeller 82 but well below the liquid level 88 is a hollow, gas-filled, stainless steel torus 90. The torus 90 defines a cylindrical duct 92 of internal diameter 130 mm through which the impeller 82 causes the liquid to flow. Within the hollow torus 90 are three ultrasonic modules 24 equally spaced around the wall of the duct 92; these modules 24 are identical to those described in relation to FIGS. 1 and 2. The torus 90 is supported by tie bars 94 (only one is shown) from the lid 74, and a tube 96 extends to above the lid 74 through which extend electrical cables (not shown) to provide power to the ultrasonic modules 24, and tubes (not shown) to carry buffer liquid and a purge gas for the torus 90.

The processing vessel 70 operates in substantially the same manner as the vessel 10 of FIG. 1. Each ultrasonic module 24 is activated so the contents of the duct 92 are subjected to sonic power; the impeller 82 is rotated so the liquid circulates through the duct 92 and around the vessel 70.

The torus 90 may be of two parts, with an annular lid sealed to the remainder of the torus 90 at its inner and outer periphery, secured together by latches (not shown) which might be external, or internal but remotely actuated. Alternatively the torus 90 might be welded together, and its external surfaces electropolished. The internal diameter of the duct 92 might differ from that mentioned above. For example it might be 180 mm or 260 mm in diameter, and it might be provided with a different number of ultrasonic modules 24, for example five or seven.

The lower surface of the torus 90 may be of substantially the same curvature as the portion of the base 76 immediately below it, and the torus 90 may be supported at such a distance above the base 76 that the liquid flow between them is sufficient to maintain solid reagents or crystals in suspension. It will be appreciated that the impeller 82 might be arranged to be above the torus 90 (as shown in broken lines) instead of below it. Furthermore the direction of flow through the duct 92 might be either downwards (as indicated by the arrows) or upwards. And, particularly in the case of a tall vessel 70, there may also be a shroud tube (not shown) aligned with the duct 92 or providing an extension of the duct 92 so as to enhance circulation within the vessel 70. Another optional feature is the provision of vertical baffles (not shown) projecting from the lower surface of the torus 90 in radial planes, so as to suppress swirling in the liquid.

I claim:

1. A processing vessel comprising walls and a base defining a container for a liquid, an impeller to cause flow of liquid in the container, a duct whose bore communicates with the liquid in the container, means for subjecting liquid in the duct to ultrasonic insonation, and the impeller being arranged to cause circulation of liquid between the duct and other parts of the container, the duct either being enclosed entirely within the container, or projecting from the container and having a dead-end remote from the container.

2. A processing vessel as claimed in claim 1 wherein the duct projects from the base of the container.

3. A processing vessel as claimed in claim 2 further comprising a shroud arranged to constrain the liquid flow in the vicinity of the impeller, the shroud being shaped so a jet of liquid is ejected into the duct.

4. A processing vessel as claimed in claim 3 wherein the container is of generally cylindrical shape, and the shroud is of circular cross-section, tapering in bore towards the end thereof nearer to the base.

5. A processing vessel as claimed in claim 1 wherein the duct is supported within the container spaced away from the walls and base thereof.

6. A processing vessel as claimed in claim 5 wherein the duct is defined by the axial aperture of a generally toroidal insonation module.

7. A processing vessel as claimed in claim 5 wherein the duct is arranged such that liquid may flow through it, and the duct forms at least part of a shroud to constrain the liquid flow in the vicinity of the impeller.

8. A processing vessel as claimed in claim 1 wherein at least the base and the walls are integral with each other.

9. A processing vessel as claimed in claim 1 wherein the insonation means comprises at least one ultrasonic transducer and an ultrasonic horn to transmit ultrasound from the transducer to the duct, the horn having a nodal flange whereby it is supported within a collar, the collar being attached to the outside of the wall of the duct, and the gaps between the horn and the collar and the wall of the duct being filled with a coupling liquid.

* * * * *

UNITED STATES PATENT AND TRADEMARK OFFICE
CERTIFICATE OF CORRECTION

PATENT NO. : 5,395,593
DATED : March 7, 1995
INVENTOR(S) : Peter David Martin

It is certified that error appears in the above—identified patent and that said Letters Patent is hereby corrected as shown below:

On the title page, item [73] Assignee:
changed to "United Kingdom Atomic Energy Authority."

Signed and Sealed this

Eighteenth Day of April, 1995

BRUCE LEHMAN

*Commissioner of Patents and Trademarks*

*Attest:*

*Attesting Officer*